(No Model.)

S. P. FERREE.
EDUCATIONAL PUZZLE.

No. 523,067.                             Patented July 17, 1894.

WITNESSES:
Herbert J. Hindes
A. D. Neilley.

INVENTOR
Samuel P. Ferree,
BY
Andrew Wilson.
ATTORNEY

THE NORRIS PETERS CO., PHOTO-LITHO., WASHINGTON, D. C.

UNITED STATES PATENT OFFICE.

SAMUEL P. FERREE, OF BROOKLYN, NEW YORK.

EDUCATIONAL PUZZLE.

SPECIFICATION forming part of Letters Patent No. 523,067, dated July 17, 1894.

Application filed May 12, 1894. Serial No. 510,989. (No model.)

*To all whom it may concern:*

Be it known that I, SAMUEL P. FERREE, of Brooklyn, Kings county, New York, have invented certain new and useful Improvements in Educational Puzzles, of which the following is a specification.

My invention relates to that class of puzzles wherein letters are employed to make various combinations of word-squares, and consists in the arrangements hereinafter set forth.

Figure 1:
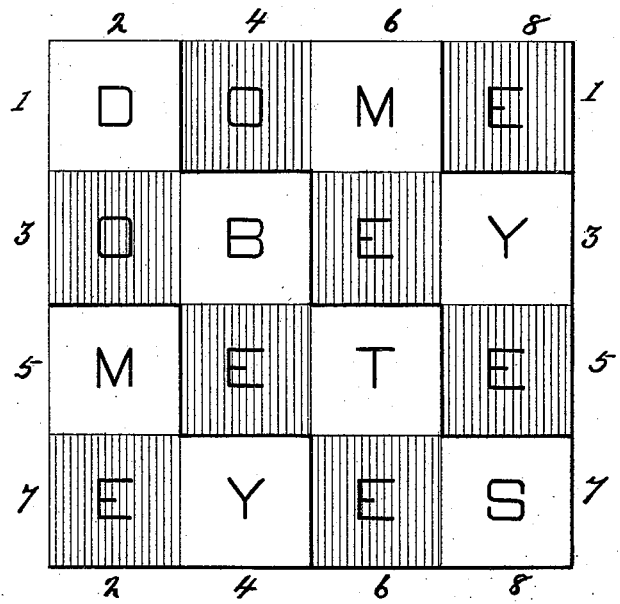
Figure 2:
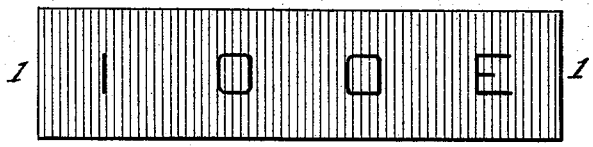

In the drawings Figure 1 is a view of the puzzle with the lettered strips woven together. Fig. 2 is a view of a single lettered strip detached.

Similar reference numbers designate similar parts in both the figures.

My invention consists in placing upon a series of suitable strips of card-board or similar material, letters which are adapted to be so arranged, that when the strips are woven together, in the proper order, as shown in Fig. 1, the letters will form word-squares, and may be read both vertically and horizontally.

Letters may be placed upon both sides of the strips, and two series of words may be arranged upon each side of the puzzle, by reversing the order in which the strips are woven, so that the portions of the strips which are covered in the arrangement shown in Fig. 1 may be exposed in the second arrangement. By this system of weaving the strips together I secure the interesting features of a word-square puzzle, dispensing with any frame or box, which is requisite when single letters are used.

The game constitutes an instructive appliance for kindergartens and similar uses; combining as it does the features of weaving the strips together, so as to form a kind of mat, and at the same time securing the proper arrangement of the letters upon the strips.

The puzzle may be modified by substituting for the letters, numbers, so arranged, that the sum of each column of figures shall appear on the final line, and two separate combinations of numbers may be secured on each side of the strips as when letters are used.

Having thus described my invention, what I claim, and desire to secure by Letters Patent of the United States, is—

1. The educational puzzle consisting of series of strips provided with characters so arranged thereupon as to form intelligible combinations when the strips are interwoven, substantially as described.

2. The educational puzzle consisting of series of strips, provided with characters so arranged thereupon as to form intelligible combinations, both horizontally and vertically, when the strips are interwoven, substantially as described.

3. The educational puzzle consisting of strips, provided with characters so arranged thereupon as to form intelligible combinations when the strips are interwoven in a vertical series and a horizontal series, substantially as described.

SAML. P. FERREE.

Witnesses:
WM. D. NEILLEY,
W. A. ALDERSON.